United States Patent [19]
Waters

[11] 4,229,948
[45] Oct. 28, 1980

[54] WATER CONSERVING SHOWERING SYSTEM

[75] Inventor: Erwin Waters, Jericho, N.Y.

[73] Assignee: S & F Sheet Metal and Welding Works Inc., Bronx, N.Y.

[21] Appl. No.: 10,710

[22] Filed: Feb. 9, 1979

[51] Int. Cl.³ .............................................. F25D 17/02
[52] U.S. Cl. ........................................... 62/376; 62/64
[58] Field of Search .................... 62/64, 373, 376, 302

[56] References Cited

U.S. PATENT DOCUMENTS

| | | | |
|---|---|---|---|
| 2,974,497 | 3/1961 | Carpenter et al. | 62/375 |
| 3,058,320 | 10/1962 | Foster et al. | 62/302 |
| 3,320,964 | 5/1967 | Tripp | 62/303 |
| 3,768,272 | 10/1973 | Barrett | 62/64 |
| 3,844,135 | 10/1974 | Zamiara | 62/375 |

*Primary Examiner*—Ronald C. Capossela
*Attorney, Agent, or Firm*—Darby & Darby

[57] ABSTRACT

A system for cooling cooked product by means of a shower achieves particularly efficient cooling through intermittent operation of the shower and is provided with a showering cabinet having separation of contaminated and uncontamined shower coolant. The floor of the cabinet is provided with a perforated upper surface which has imperforate troughs for receiving the wheels of a product-containing rack. In addition, at least one walkway extends along the floor and is adapted to be covered entirely by a removeable, vaulted walkway cover. Coolant passing through the perforated upper surface is accumulated and recirculated for use by the shower. However, contaminated coolant which accumulates in the troughs, is routed to a drain for disposal. The vaulted cover shields the contaminated walkway, prevents coolant from being contaminated by the walkway and directs the coolant to the perforated upper surface for recirculation. Consistent results and greatest conservation of coolant are obtained by sensing the surface temperature of a random sample of the product and controlling repetitive on and off times of the shower to achieve a specific reduction in temperature. Showering of the product is terminated when its core achieves a predetermined temperature.

13 Claims, 4 Drawing Figures

WATER CONSERVING SHOWERING SYSTEM

BACKGROUND OF THE INVENTION

The present invention relates generally to cooling of heated products, and more particularly, concerns a showering system and method for conserving the use of coolant in cooling cooked food products, such as meats.

In producing certain processed meat products, such as frankfurters, sausages, cold cuts, and certain solid meat items, it is the conventional practice to cook or smoke the product and then to cool it rapidly by showering, so that heat is uniformly extracted from its surface. Typically, a quantity of the product is mounted on open racks for cooking or smoking. The racks are usually arranged to be movable as a result of having wheels, or the like. In this manner, a rack of product is conveniently brought into a smokehouse or large oven and left there for the duration of the cooking or smoking process. Upon completion of that process, the rack can then be transported to a shower and cooled appropriately.

Typically, the cooling shower utilizes tap water as a coolant, because of its ready availability and relatively low cost and general availability. However, an ever present problem in this industry has always been the large quantity of water which is utilized in cooling the cooked product. It has been suggested that a substantial reduction in water consumption could be achieved by recirculating the water within the shower. Although this has proved effective in closed systems, it has generally been inapplicable in meat processing plants. One of the primary difficulties has been that the racks of product are moved along the factory's floor which is a contaminated surface. In addition, it is necessary for workers who transport the racks of product to walk within the shower stalls and upon the floors thereof. Water used to shower the product which falls upon the contaminated rack wheels and/or the shower floor, becomes contaminated. If this water were then recirculated in unpurified form and used to shower the product, the food product itself would become contaminated. Thus, the meat processing industry has long avoided coolant recirculation in systems with movable racks.

In copending U.S. patent application No. 14,308 filed Feb. 23, 1979, which is assigned to the assignee of the present patent application, Rudolf Maurer discloses that more efficient showering of heated products and an improvement in the product itself can be achieved by intermittent showering. Specifically, Maurer discloses that more rapid cooling and effective tempering of the surface of the product are achieved by repeated, intermittent showering by showering the product for a specified period of time followed by a period during which the shower is turned off and during which heat is transmitted from the core of the product to heat its surface. In practice, it has been found that cooling and conditioning products by this process can be substantially consistently achieved by considering the size of the product, its initial (hot) temperature and the temperature of the tap water. Specifically, excellent results could be obtained by determning the on and off times of the shower from a table which considered the product characteristics, the desired temperature change and the temperature of the tap water. However, it becomes difficult to obtain consistent results in a system where the coolant is recirculated because the temperature of the coolant changes during the process, unlike tap water which has a relatively constant temperature over long periods of time.

OBJECTIVES OF THE INVENTION

Broadly, it is an object of the present invention to overcome the disadvantages of prior cooling systems utilizing showers. Specifically, it is contemplated that a showering system for cooling a food product on moveable racks to be provided in which water conservation is achieved by recirculating the water, without contaminating the food product.

It is another object of the present invention to obtain consistent product cooling and conditioning in a showering system which recirculates coolant and also utilizes intermittent showering.

It is yet another object of the present invention to provide a recirculatory intermittent showering system and method which can readily be utilized with existing showering equipment with a minimum of modification.

It is also an object of the present invention to provide a showering system for cooling food products which is convenient and efficient to use, yet relatively inexpensive and simple in construction.

In accordance with an illustrative embodiment of the present invention, a shower cabinet for cooling of food product is provided with a specially constructed floor which permits recirculation of the coolant without contamination of the product. The floor of the cabinet is provided with a perforated upper surface in which imperforate troughs are provided to receive the wheels or other supporting members of the product containing racks. In addition, the floor assembly includes at least one walkway extending therealong which is adapted to be covered entirely by a vaulted walkway cover. Coolant passing through the perforated upper surface is accumulated and recirculated for use by the shower. However, coolant which accumulates in the troughs, (and which has therefore passed over the contaminated wheels or support members) is routed to a drain for disposal. In addition, the vaulted cover shields the contamined walkway, prevents coolant from contacting the walkway, and directs the coolant to the perforated upper surface for recirculation. In this manner, contaminated and uncontaminated coolant are kept separate at all times, the contaminated coolant being disposed of and the uncontaminated coolant being recirculated without contaminating the food product.

Particularly efficient cooling and conditioning of the food product is achieved by intermittent operation of the shower. In a preferred embodiment, consistent results and greatest conservation of coolant are obtained by sensing the surface temperature of a random sample of the product and controlling the on time of the shower to achieve a specific reduction in temperature. Showering of the product is terminated when its core achieves a predetermined temperature.

DESCRIPTION OF THE DRAWINGS

The foregoing brief description, as well as further objects, features and advantages of the present invention will be more fully understood from the following detailed description of a presently preferred, but nonetheless illustrative, embodiment in accordance with the present invention, with reference being had to the accompanying drawing, in which:

FIG. 4 is a detailed view if a sample of the product mounted on the rack, and shows temperature probes applied to measure the surface temperature and core temperature of the product to control intermittent operation of the shower.

Referring now to the details of the drawing, FIG. 1 illustrates a showering system 10 incorporating objects and features of the present invention. The system 10 broadly comprises: a cabinet 12 in which the product to be cooled is showered with coolant; a mixing tank 14 which stores the coolant during shower operation and in which fresh coolant is mixed with recirculating coolant to replace losses; a recirculating system 16 which incorporates various conduits, electrically operated valves, and pumps to achieve coolant recirculation and drainage; and a control assembly, which is adapted to sense electrical signals at various points in the system 10 and to control the valves and pumps in the recirculating system to achieve selected operation thereof.

Figure 1:
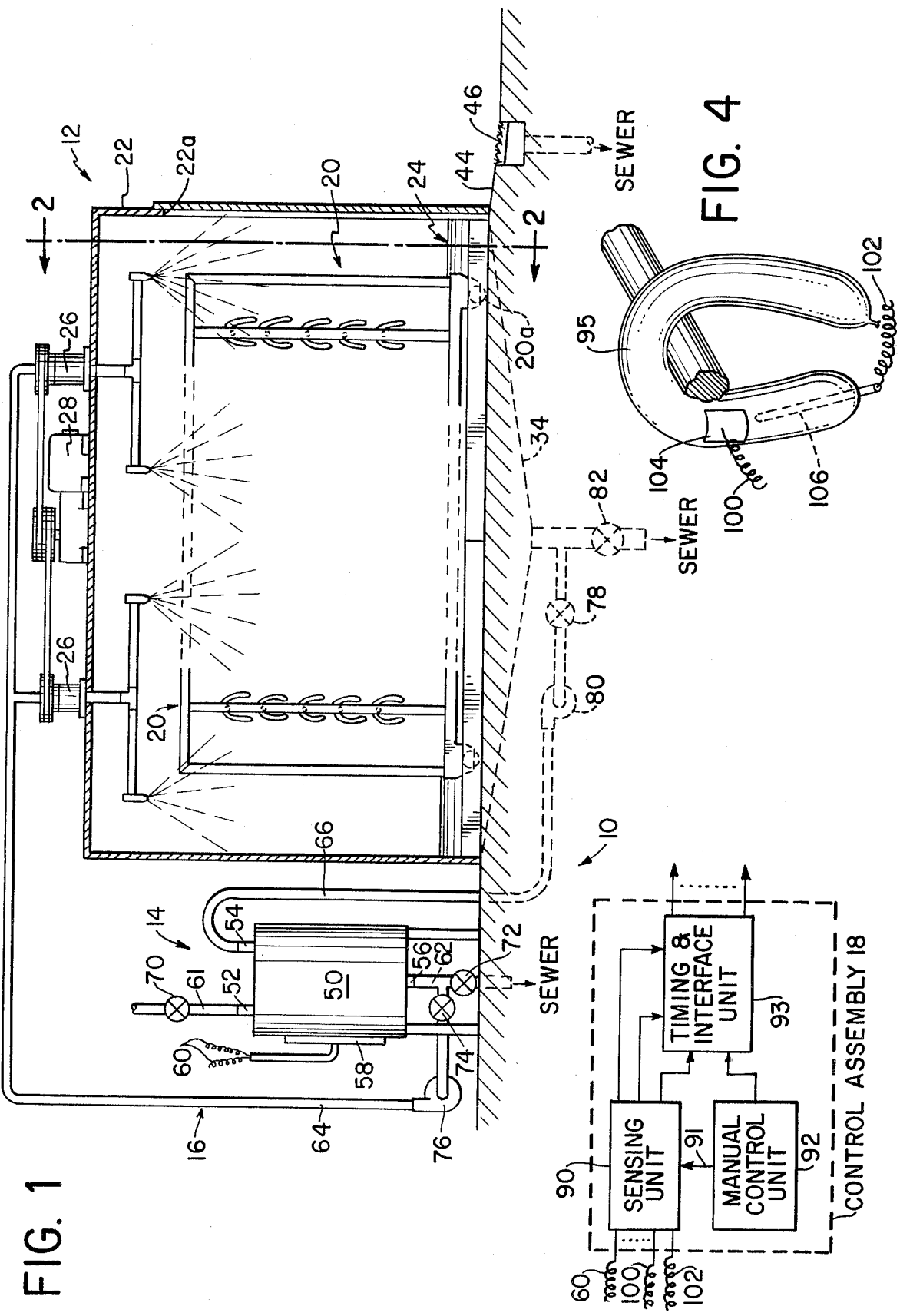
FIG. 1 is a side elevational view of a recirculating showering system in accordance with the present invention, the shower cabinet being shown in section with a rack of product therein.
Figure 2:
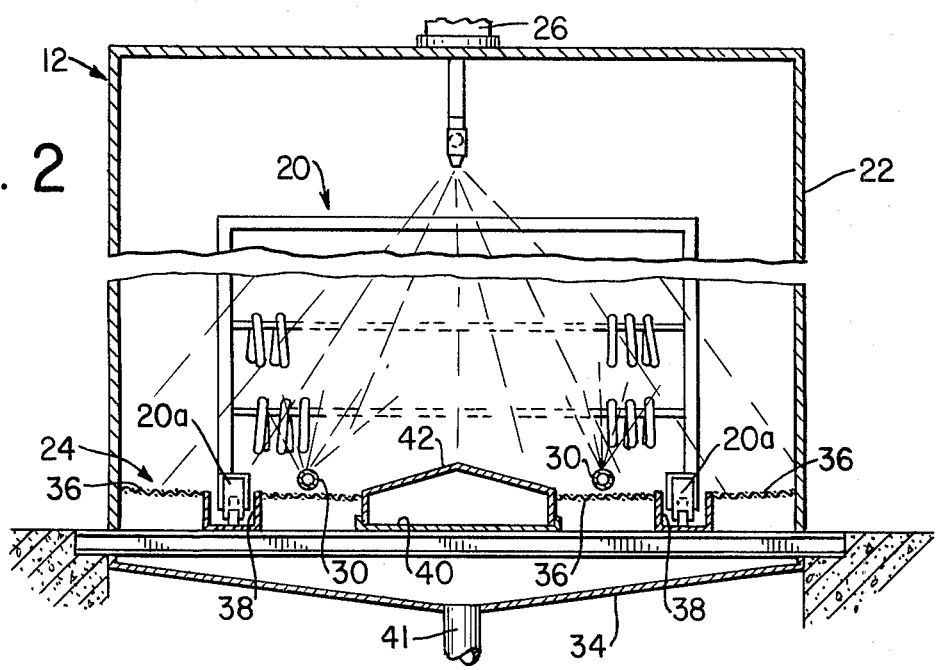
FIG. 2 is a sectional view taken substantially along line 2—2 in FIG. 1 to illustrate further details of the shower cabinet construction.
Figure 3:
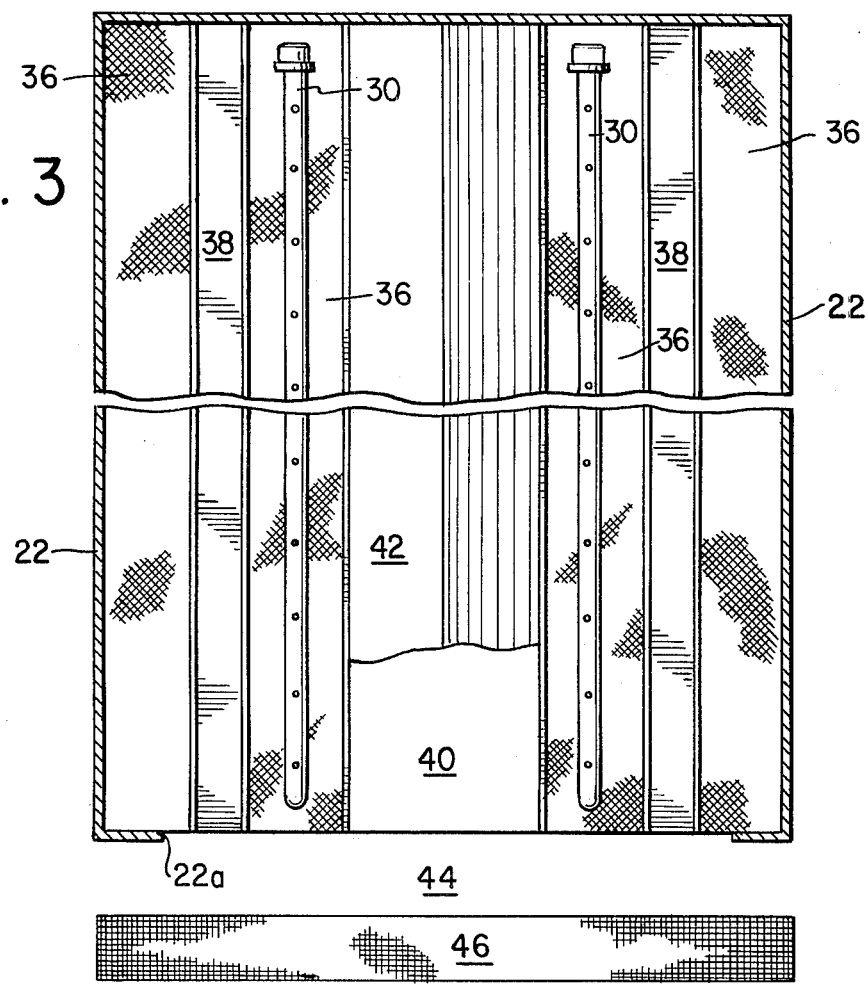
FIG. 3 is a top sectional view of the shower cabinet of FIG. 2 with the product retaining rack removed.

In practice, a quantity of the product is mounted on an open rack 20 for cooking or smoking and, upon completion of either of these processes, the entire rack is moved into the cabinet 12, where the product is cooled. In operation, control assembly 18 is adjusted to provide a desired mode of operation and, based upon the adjustment, controls the on and off times of the shower, as well as the recirculation, replenishment, and drainage of circulating coolant. In an automatic mode of operation, control assembly 18 senses electrical signals at various points in system 10 and controls the shower intervals and coolant recirculation cycles accordingly.

Cabinet 12 includes a conventional housing 22 with a doorway 22a and a floor assembly 24. On the ceiling of housing 22, are mounted a pair of conventional rotary shower head assemblies 26 (producing a downwardly directed shower) and a conventional electric motor 28 which rotates the shower heads under control of control assembly 18. On top of the floor assembly 24, there are mounted a pair of upwardly directed line showers 30. A sliding door 32, or the like, is provided to close off doorway 22a during showering. The entire shower cabinet 12 is designed to be supported on the floor of the processing area.

The shower assemblies 26 and 30 and the motor 28 may be any generally available devices of this type and need have no special features in order to be useful in this system. The housing 22 can be made of any sturdy, waterproof material, and any conventional shower housing may be utilized for this purpose.

Floor assembly 24 broadly comprises a floor structure 32 and a recessed basin 34. The floor structure 32 has a perforated upper surface 36 which may, for example, be a grating. Imperforate troughs 38 and a walkway 40 interrupt the perforated upper surface. A vaulted cover 42 is provided over the walkway 40 and the upper surface of the cover projects above the level of surface 36. Floor structure 32 may be supported on the floor of the processing area by any conventional means.

Basin 34 is positioned below and aligned with floor structure 32 and is in direct, spaced communication with the perforated surface 36. The basin slopes gently downwardly so as to be deepest at its center, where a drain pipe 40 is provided.

In using the cabinet 12, the cover 42 is removed from walkway 40 when the rack 20 is being moved into or out of the cabinet. Workmen who transport the rack 20 can then walk on walkway 40 and the wheels 20a of rack 20 travel within troughs 38. It will be appreciated that wheels 20a are contaminated by virtue of coming in contact with the processing area floor on the way to cabinet 12 and that walkway 40 is contaminated by virtue of workmen having walked thereon. Consequently, any shower water which comes in contact with either the wheels 20a or walkway 40 becomes contaminated and should not be recirculated.

Once rack 20 is inside cabinet 12, cover 42 is replaced, door 32 is closed, and showering can begin. During showering, any water coming in contact with wheels 20a enters trough 38, and no coolant can come in contact with walkway 40 because it is shielded by cover 42. Thus, any coolant which does not enter troughs 38 either passes directly through perforated surface 36 or flows down the vaulted upper surface of cover 42 and through surface 36. In either case, this coolant is collected in basin 34 and is returned through drain 44 for recirculation. Coolant which is collected in troughs 38 runs out of the troughs onto a sloped portion 44 of the processing area floor and is directed into a drainage trough 46 for disposal.

From the foregoing description, it will be appreciated that water emitted by the shower is divided into contaminated and uncontaminated portions and that these portions are processed separately, the contaminated portion being disposed of and the uncontaminated portion being recirculated.

Mixing tank 14 includes a convention storage tank 50 with inlets 52 and 54 and an outlet 56. In addition, a coolant level sensing unit 58 is mounted on tank 50 and provides, on leads 60, a electrical signal representative of the level of coolant in tank 50. The electrical signal on lead 60 is provided as an input to control assembly 18.

Coolant recirculation system 16 includes an inlet conduit 60 which supplies coolant from a source to (such a public water supply) inlet 52 of tank 50, an outlet conduit 62 which connects the outlet 56 of tank 50 to a sewer or sump, a conduit 64 which connects between conduit 62 and the showers 26 and 30 (the connection of coduit 64 to showers 30 is not shown), and a conduit 66 which is connected between drain conduit 40 of basin 34 and inlet 54 of tank 50. In addition, an electrically controlled valve 70 is connected to control the flow in conduit 60, a valve 72 is connected to control the flow in conduit 62, a valve 74 and pump 76 are connected to control the flow in conduit 64, a valve 78 and pump 80 are connected to control the flow in conduit 66, and a valve 82 controls the flow in drain conduit 40. All of these valves and the pumps are controlled by output signals provided by control assembly 18.

In operation, level sensing unit 58 and valve 70 cooperate with control assembly 18 to maintain a constant coolant level within tank 50. This assures that coolant lost to troughs 38 is replaced, via conduit 60, with fresh coolant from the coolant source. When the signal on lead 60 indicates that the coolant level is below a predetermined level, control assembly 18 opens valve 70, permitting coolant from the source to enter tank 50. When the signal on lead 60 indicates that the coolant level has been restored to the predetermined level, control assembly 18 closes valve 70, terminating the flow of coolant from the source.

Under normal recirculating operation of the showering system, the valves 72 and 82 are closed, so that the tank 50 and basin 34 are isolated from the sewer. In addition, the valves 74 and 78 are open and the pumps 76 and 80 are operated during all active (shower on) showering intervals. As a result, there is a continuous flow of coolant from tank 50 to showers 26 and 30, via conduit 64. Also, coolant from basin 34 is returned to tank 50 via conduit 66. Thus, the flow through conduits 64 and 66 results in a continuous recirculation of coolant while coolant lost to troughs 38 is replaced with fresh coolant via conduit 60, as explained above. When the product has been cooled to the desired temperature, valves 74 and 78 are closed, terminating the recirculation of coolant.

As a final operational step, valves 72 and 82 are opened so that the coolant which has been recirculated during product cooling is expelled from tank 50 and base 34 to the sewer. After tank 50 and basin 34 are completely drained, valves 72 and 82 are once again closed and valve 70 is opened. At this time, tank 50 begins receiving fresh coolant from the source. When level control unit 58 signals to control assembly 18 that tank 50 is full, valve 70 is closed to stop the flow of coolant and the system is ready for showering the next rack of product.

Thus far, it has been described how the various components cooperate to achieve product showering with coolant recirculation. This operation is controlled by control assembly 18. If nothing more than showering with recirculation were desired control assembly 18 need include only a detecting circuit and switch arrangement. The detecting circuit produces an actuating current to open valve 70 when the signal on leads 60 indicates a low coolant level in tank 50. The switching arrangement could be as simple as two on/off switches. One switch would operate the components which achieve recirculation and the other switch would operate valves 72 and 82 to drain the system upon completion of showering. For greater convenience, a conventional timer could replace the two switches. This timer would be set to provide recirculating showering for a selected period and, upon timing out, would operate valves 72 and 82 to drain the system.

As taught by Maurer, more efficient use of coolant and an improved product are obtained by intermittent showering. As a minimum, this requires that pump 76 and/or valve 74 be turned on and off during the recirculating showering operation. This in turn requires that control assembly 18 further include a mechanism to control the on and off intervals of pump 76 and/or valve 74. Two specific types of such mechanisms will be discussed, by way of example. The first is a simple cyclical timer in which the on interval and the off interval or recycle time are preselected and the timer recycles continuously, turning the shower on and off for the selected intervals. The second type of mechanism is adaptive, utilizing signals derived from a probe placed on a sample of the product to control intermittent showering.

Control assembly 18 broadly comprises a sensing unit 90, a manual control unit 92, and a timing and interface unit 93. The manual control unit is a control box comprised of conventional switches and control elements, which permit system 10 to be adapted for various types of operation, including recirculating continuous showering, timed intermittent showering and adaptive intermittent showering (with or without recirculation), described above. Adaptive operation is achieved by manipulating a switch in unit 92 to enable sensing unit 90 via lead 93. If adaptive operation is selected, sensing unit 90 controls timing and interface unit 93; otherwise, sensing unit 90 has no effect on unit 93 (although the interface circuits thereof are used, for example, to buffer the signal on leads 60), but timed operation of the system may be achieved by adjusting timing and interface unit 93 so that specific on and off intervals are achieved for the showers.

Sensing unit 90, has, as inputs, leads 60 of level sensor 58 and leads 100 and 102, which are attached to a random sample of the product, as will be explained in more detail below. In addition, it may be desirable to monitor some points in the system and to include circuitry within sensing unit 90 responsive to the monitored signal. Sensing unit 90 includes conventional sensing elements, such as comparators, which sense the signals on its input leads and produce various actuating signals depending on the condition of the input signals. These actuating signals are transmitted to timing and interface unit 93 and, therethrough, to various valves, pumps, or motor 28, and are effective to control the operation of the same.

Timing and interface unit 93 includes conventional timers which can be adjusted to control the on and off times of showers 26 and 30 when timed operation is desired, and also includes conventional interface circuits, such as amplifiers or transformers, through which control signals provided from sensing unit 90 are coupled to various system components such as pumps, valves, or motor 28.

FIG. 4 illustrates how probes can be attached to a random sample 95 of the product to achieve adaptive automatic, rather than timed, operation of the system 10. The lead 100 is connected to a probe 104 on the surface of the product and the lead 102 is connected to a probe 106 which senses the temperature at the core of the product. Probe 104 may be either a temperature probe or a probe which senses moisture at the surface of the product. Several exemplary methods of operating the system are described below.

The simplest mode of automatic operation is, of course, to operate without sensing unit 90 and to adjust timing and interface unit 93 to provide predetermined on and off intervals for showering and to shut down after showering for a predetermined length of time. This is the mode of operation contemplated by Maurer and requires the use of tables, or the like, to determine the various times in accordance with initial temperature, desired final temperature, coolant temperature, and various product characteristics and dimensions. As explained above, this mode of operation is most effective when coolant recirculation is not utilized, although it may be employed in a recirculating system if less efficient operation is acceptable.

The most basic level of adaptive improvement is achieved by providing a probe 106 in the core of product sample 95 to sense the temperature of the core. This permits automatic shutdown of the showering system when the desired final core temperature is reached. As a result, racks of product in different cooling runs are consistently cooled to the same core temperature, rather than operating on the basis of an overall showering time, which only yields approximately the same core temperature in different runs.

Another level of improvement is achieved by adding a surface probe 104 to the random sample of product and utilizing the signal from this probe to control the turn on of the shower. The shower is then kept on for a fixed interval sufficient to bring the surface of the product to substantially the temperature of the coolant. Probe 104 may sense temperature, in which case the shower is turned on when the surface of the product is warmed by a certain amount with heat from its core. Alternately, probe 104 may sense moisture, in which case the shower is turned on after the surface of the product has been warmed sufficiently for all moisture on the surface to evaporate. In either case, the shower is turned on for a fixed interval, but the on intervals become spaced further apart in time as the core of the product cools. Thus, coolant is consumed at a decreasing rate as the product is cooled, and particularly efficient utilization of the coolant is achieved. Shutdown of the system can be achieved either by sensing the temperature of the core by means of a probe 106, by setting the overall operating time to a predetermined interval, or by sensing the time between successive on intervals of the shower and shutting down when this time exceeds a certain predetermined amount.

Although preferred forms of the invention have been disclosed for illustrative purposes, those skilled in the art will appreciate that many additions, modifications and substitutions are possible without departing from the scope and spirit of the invention as defined by the accompanying claims. For example, not only could the surface probe be used to control on and off showering intervals, but where that probe is a temperature probe, the difference between the surface and core temperatures could be used as a reliable control for the showering intervals.

What is claimed is:

1. In a system for cooling a food product with a showering apparatus providing a stream of coolant, a showering cabinet adapted to receive a quantity of said product on a rack for cooling and to achieve recirculation of said coolant without contamination thereof, said cabinet comprising:
    collection means, defining part of a floor for said cabinet, for receiving coolant which has not come in contact with contaminated portions of said rack and said cabinet, said collection means being connected to provide coolant for recirculation to said showering apparatus, and
    diverting means, defining part of a floor for said cabinet, for receiving coolant which has come in contact with contaminated portions of said rack, said diverting means being connected to divert contaminated coolant for disposal, said diverting means being lower in position than that portion of said collection means which first receives coolant.

2. The system of claim 1 wherein said collection means comprises:
    a perforated surface forming an upper surface for said floor, and
    a basin in spaced communication with said perforated surface and positioned in alignment therewith to collect coolant passing therethrough for recirculation to said showering apparatus.

3. The system of claim 2 wherein said diverting means comprises at least one imperforate trough interrupting said perforated surface and extending therebelow, said at least one trough being positioned to receive lower portions of said rack subjected to contamination.

4. The system of claim 3 adapted for use with a moveable rack incorporating wheel means on which said rack may be rolled about, said wheel means being received in said at least one trough, said trough being arrange to permit rolling said rack into and out of said cabinet.

5. A system according to any one of claims 2-4 wherein said cabinet further comprises:
    a walkway interrupting said perforated surface, said walkway being adapted for use by persons entering said cabinet, and
    a removeable vaulted cover positioned over said walkway to shield the same from being contacted by coolant, said cover projecting above said perforated surface so that coolant contacting said cover is directed to said perforated surface.

6. The system of claim 1 wherein said cabinet further comprises:
    a walkway in the cabinet floor adapted for use by persons entering said cabinet; and
    a removeable cover positioned over said walkway to shield the same from being contacted by coolant, said cover projecting above said collection means so that coolant contacting said cover is directed to said perforated surface.

7. A system according to claim 1 further comprising circulation means for providing flow of coolant from said collection means to said showering apparatus, said circulation means being adapted for connection to a source of coolant and including means for controlling the flow of coolant from said source to replenish coolant lost to said diverting means.

8. A system according to claim 7 wherein said circulation means includes means for controllably interrupting the flow of coolant to said showering apparatus, said interrupting means including means for independently selecting the on interval and the repetition rate of on intervals of said showering apparatus, as well as the total operating time thereof.

9. A system according to claim 8 wherein said selecting means incorporates independently adjustable timing means.

10. A system according to claim 8 further comprising a temperature probe within a selected sample of said product and coupled to said interrupting means, and normally on switch means, responsive to the temperature probe, for turning off when said temperature probe indicates the attainment of a preselected temperature within said product.

11. A system according to any one of claims 8-9 further comprising a surface probe on the surface of a selected sample of said product, said surface probe being coupled to said interrupting means to control at least one of: the on interval of said showering apparatus; and the repetition rate of on intervals.

12. The system of claim 11 wherein said surface probe senses temperature.

13. The system of claim 11 wherein said surface probe measures moisture.

* * * * *